US008773553B2

(12) United States Patent
Torikai et al.

(10) Patent No.: US 8,773,553 B2
(45) Date of Patent: Jul. 8, 2014

(54) INFORMATION APPARATUS FOR ACQUIRING IMAGE FILE AND LOG FILE, AND CONTROL METHOD THEREOF

(75) Inventors: Hiroyuki Torikai, Tokyo (JP); Kazuya Shinozaki, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 151 days.

(21) Appl. No.: 13/356,971

(22) Filed: Jan. 24, 2012

(65) Prior Publication Data

US 2012/0200716 A1    Aug. 9, 2012

(30) Foreign Application Priority Data

Feb. 4, 2011    (JP) ................................. 2011-023244

(51) Int. Cl.
H04N 5/76    (2006.01)
(52) U.S. Cl.
USPC ..................................... 348/231.2; 348/231.3
(58) Field of Classification Search
CPC ...... H04N 5/77; H04N 1/2112; H04N 1/2129
USPC ......... 348/231.99, 231.2, 231.3, 231.5, 231.6
See application file for complete search history.

(56) References Cited

U.S. PATENT DOCUMENTS

| 2003/0076427 | A1* | 4/2003 | Kawamura et al. ........ 348/231.3 |
| 2008/0211927 | A1* | 9/2008 | Nozaki et al. ............. 348/231.7 |
| 2009/0135274 | A1* | 5/2009 | Kim et al. ................ 348/231.5 |
| 2010/0097494 | A1* | 4/2010 | Gum et al. ................ 348/231.5 |
| 2010/0157095 | A1* | 6/2010 | Karn et al. ................ 348/231.1 |
| 2010/0220213 | A1* | 9/2010 | Ueno et al. ................ 348/231.3 |
| 2010/0289920 | A1* | 11/2010 | Mizuno ..................... 348/231.3 |

FOREIGN PATENT DOCUMENTS

JP    2009-171269    7/2009

* cited by examiner

Primary Examiner — Kelly L Jerabek
(74) Attorney, Agent, or Firm — Cowan, Liebowitz & Latman, P.C.

(57) ABSTRACT

An information processing apparatus which is connectable with an image supplying apparatus having a unit which acquires position information, comprising: a file acquiring unit which acquires, from the image supply apparatus, an image file having shooting position information attached and a log file indicating locations along a path of movement of the image supplying apparatus; a file designating unit which designates an image file and a log file to be transferred from the image supplying apparatus; and a determining unit which determines, in a case that a file to be transferred is designated by the file designating unit, whether the designated file has already been transferred, wherein the determining unit determines whether the file has already been transferred, in accordance with a determination procedure that differs between a case where the designated file is an image file and a case where the designated file is a log file.

26 Claims, 15 Drawing Sheets

FIG. 4

```
400
  @Canon/Model X100/2BFE51EB2A784be4833CE6B330D63916
  401 402  402  403
  $GPGGA,062404.000,3534.0002,N,13940.8300,E,1,09,1.0,46.12,M,39.45,M,,0000*6D
  $GPRMC,062404.000,A,3534.0002,N,13940.8300,E,0.17,59.42,040910,,,A*5D          405
  $GPGGA,062428.000,3533.9994,N,13940.8321,E,1,09,1.0,49.88,M,39.45,M,,0000*64
  $GPRMC,062428.000,A,3533.9994,N,13940.8321,E,0.17,24.13,040910,,,A*56
  $GPGGA,062451.000,3533.9979,N,13940.8314,E,1,09,1.0,29.28,M,39.45,M,,0000*63
  $GPRMC,062451.000,A,3533.9979,N,13940.8314,E,0.48,120.32,040910,,,A*61
  $GPGGA,075630.000,3533.9946,N,13940.8252,E,1,10,0.8,19.80,M,39.45,M,,0000*6F
  $GPRMC,075630.000,A,3533.9946,N,13940.8252,E,0.52,69.77,040910,,,A*5B
  $GPGGA,075648.000,3533.9987,N,13940.8291,E,1,09,0.8,26.10,M,39.45,M,,0000*6F
  $GPRMC,075648.000,A,3533.9987,N,13940.8291,E,0.64,355.06,040910,,,A*69
  $GPGGA,075707.000,3533.9951,N,13940.8278,E,1,10,0.8,33.67,M,39.45,M,,0000*65
  $GPRMC,075707.000,A,3533.9951,N,13940.8278,E,0.46,289.97,040910,,,A*67
   ...
404
```

FIG. 11

```
1100 — <?xml version="1.0" encoding="utf-8"?>
       <GanonGPS>
           <Version>1.0</Version>
           <LogFile>
1101 —         <FileName>1009040.log</FileName>
1102 —         <Path>C:\Users\admin\Documents\\GPS Log Files\1009040.log</Path>
1103 —         <StartTime>2010-09-04T06:24:04</StartTime>
1104 —         <EndTime>2010-09-04T21:56:07</EndTime>
1105 —         <TimeStamp>2010-09-04T23:56:07</TimeStamp>
1106 —         <ModelName>Model X100</ModelName>
1107 —         <SerialNumber>2BFE51EB2A784be4833CE6B330D63916</SerialNumber>
           </LogFile>
           <LogFile>
               <FileName>1009050.log</FileName>
               <Path>C:\Users\admin\Documents\\GPS Log Files\1009050.log</Path>
               <StartTime>2010-09-05T00:03:12</StartTime>
               <EndTime>2010-09-04T21:56:07</EndTime>
               <TimeStamp>2010-09-05T18:24:03</TimeStamp>
               <ModelName>Model X100</ModelName>
               <SerialNumber>2BFE51EB2A784be4833CE6B330D63916</SerialNumber>
           </LogFile>
                           :
```

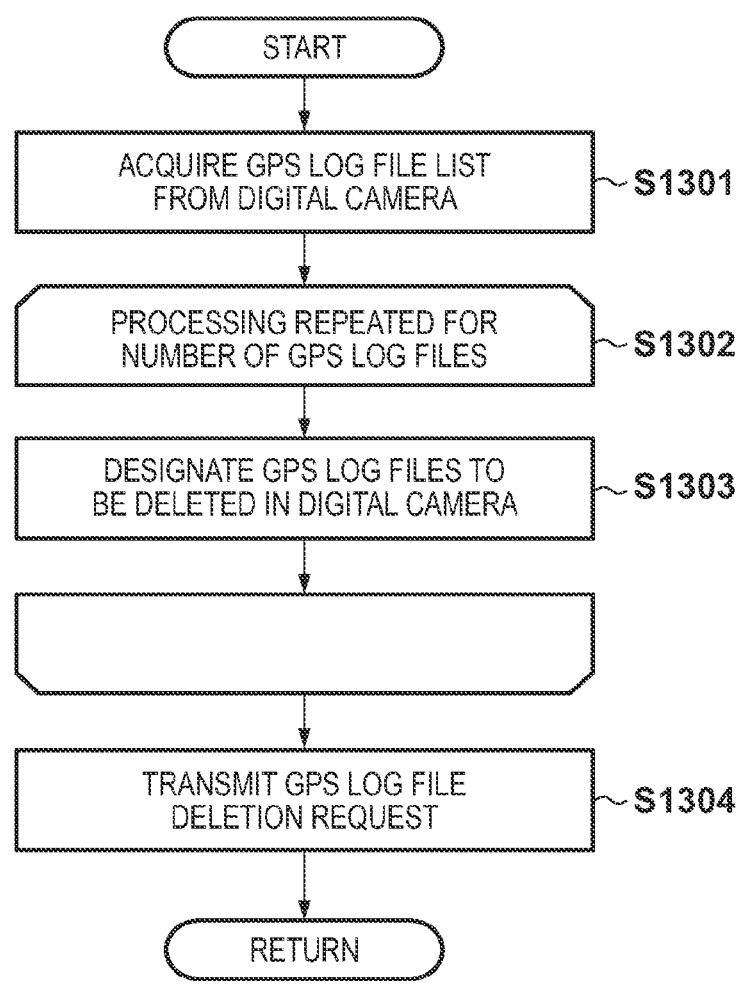

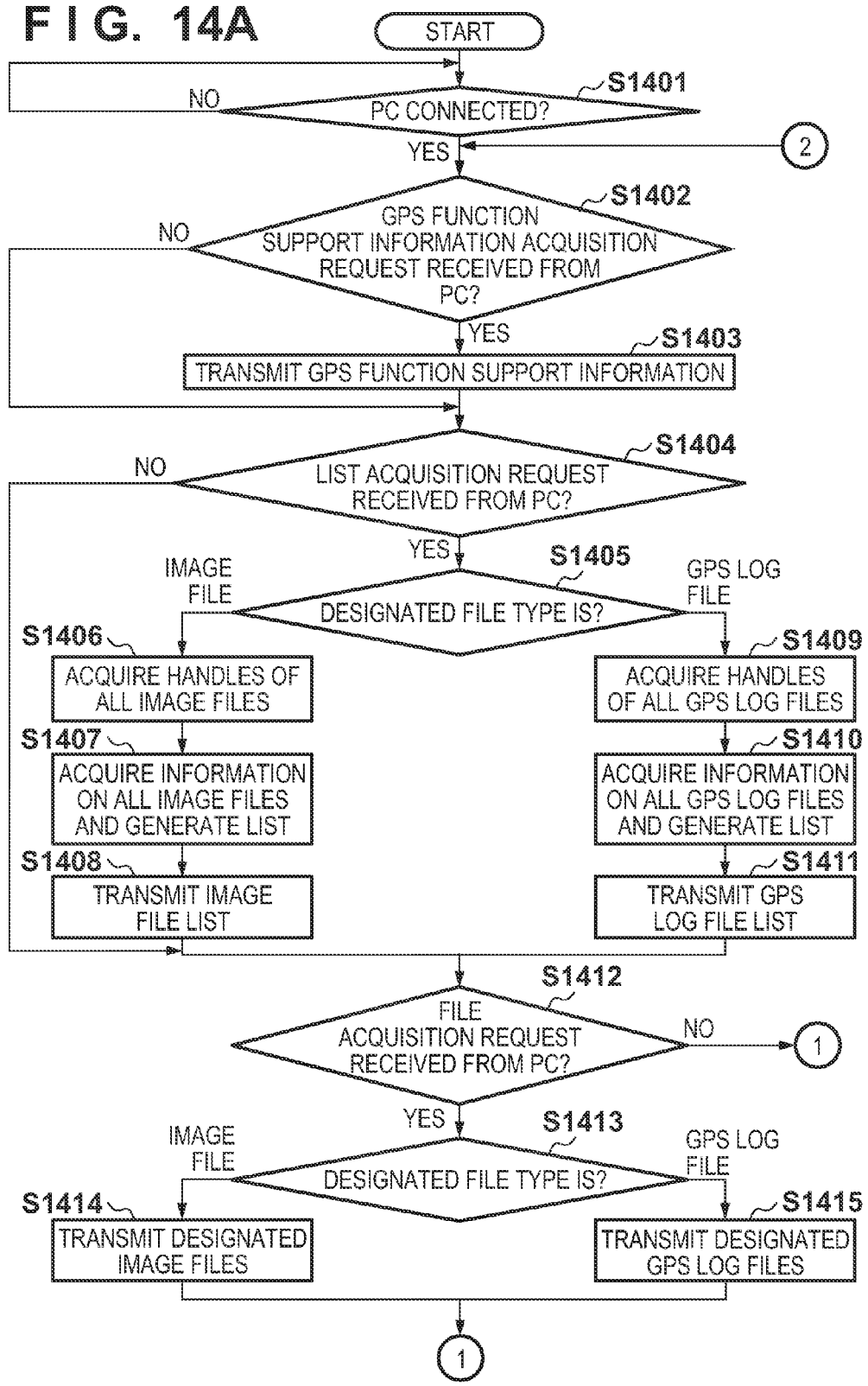

INFORMATION APPARATUS FOR ACQUIRING IMAGE FILE AND LOG FILE, AND CONTROL METHOD THEREOF

BACKGROUND OF THE INVENTION

1. Field of the Invention

The present invention relates to a technique for transferring files between an image capturing apparatus and an information processing apparatus.

2. Description of the Related Art

Heretofore, there exists software for mapping image files shot with a digital still camera (hereinafter, digital camera) and the locations along a path of movement (trajectory) of a user. To acquire a user's trajectory with this software, a GPS (Global Positioning System) logging apparatus is used. The GPS logging apparatus has the function of receiving signals from GPS satellites and recording a history of positioning dates and times and position information (latitude and longitude) as positioning information (hereinafter, GPS logging function). As a result of the user carrying around a GPS logging apparatus, GPS log files are generated as the trajectory of the user.

With Japanese Patent Laid-Open No. 2009-171269, image files shot with a digital camera are transferred and captured from the digital camera into a PC, and GPS log files generated by a GPS logging apparatus are transferred and captured from the GPS logging apparatus into the PC.

With the technique described in Japanese Patent Laid-Open No. 2009-171269, image files and GPS log files are separately transferred and captured respectively from the digital camera and the GPS logging apparatus into the PC. However, in the case where two different files are separately captured, the user must often perform complicated operations. Further, in a case where two files differ in attributes, it is also conceivably inefficient to use the same capturing method.

SUMMARY OF THE INVENTION

The present invention has been made in consideration of the aforementioned problems, and realizes a technique of enabling the capturing of files that differ in attributes, such as image files and GPS log files, by a simple operation.

In order to solve the aforementioned problems, the present invention provides an information processing apparatus which is connectable with an image supplying apparatus having a unit configured to acquire position information, comprising: a file acquiring unit configured to acquire, from the image supply apparatus, an image file having shooting position information attached and a log file indicating locations along a path of movement of the image supplying apparatus; a file designating unit configured to designate an image file and a log file to be transferred from the image supplying apparatus; and a determining unit configured to determine, in a case that a file to be transferred is designated by the file designating unit, whether the designated file has already been transferred, wherein the determining unit determines whether the file has already been transferred, in accordance with a determination procedure that differs between a case where the designated file is an image file and a case where the designated file is a log file.

In order to solve the aforementioned problems, the present invention provides a control method of an information processing apparatus which is connectable with an image supplying apparatus having a unit configured to acquire position information, the method comprising the steps of: acquiring, from the image supplying apparatus, an image file having shooting position information attached and a log file indicating locations along a path of movement of the image supplying apparatus; designating an image file and a log file to be transferred from the image supplying apparatus; and determining, in a case that a file to be transferred is designated in the file designation step, whether the designated file has already been transferred, wherein the determining step comprises determining whether the file has already been transferred, in accordance with a determination procedure that differs between a case where the designated file is an image file and a case where the designated file is a log file.

According to the present invention, image files and GPS log files can be captured by a simple operation.

Further features of the present invention will become apparent from the following description of exemplary embodiments (with reference to the attached drawings).

BRIEF DESCRIPTION OF THE DRAWINGS

FIG. 4 is a diagram showing the recorded contents of a GPS log file generated with the GPS logging function of the digital camera in the embodiment.

FIG. 11 is a diagram showing the recorded contents of a transferred GPS log file information list in the embodiment.

FIG. 13 is a flowchart showing a processing procedure in the PC at the time of deleting GPS log files possessed by the digital camera in the embodiment.

FIGS. 14A and 14B are flowcharts showing a processing procedure in the digital camera at the time of capturing image files and GPS log files from the digital camera into the PC in the embodiment.

DESCRIPTION OF THE EMBODIMENTS

Embodiments of the present invention will be described in detail below. The following embodiments are merely examples for practicing the present invention. The embodiments should be properly modified or changed depending on various conditions and the structure of an apparatus to which the present invention is applied. The present invention should not be limited to the following embodiments. Also, parts of the embodiments to be described later may be properly combined.

In the following embodiments, descriptions will be made by taking a personal computer (hereinafter, PC) as an example of an information processing apparatus or an external apparatus according to the present invention and taking a digital camera as an example of an image capturing apparatus or an image supplying apparatus according to the present invention. Note that the image capturing apparatus or image supplying apparatus includes a device with an image file generator that photo-electrically converts light from an object and performs image sensing to generate image data, in addition to a digital still camera, a digital video camera, or the like.

Configuration of Digital Camera

The configuration of a digital camera 100 according to this embodiment will now be described with reference to FIG. 1.

Figure 1:
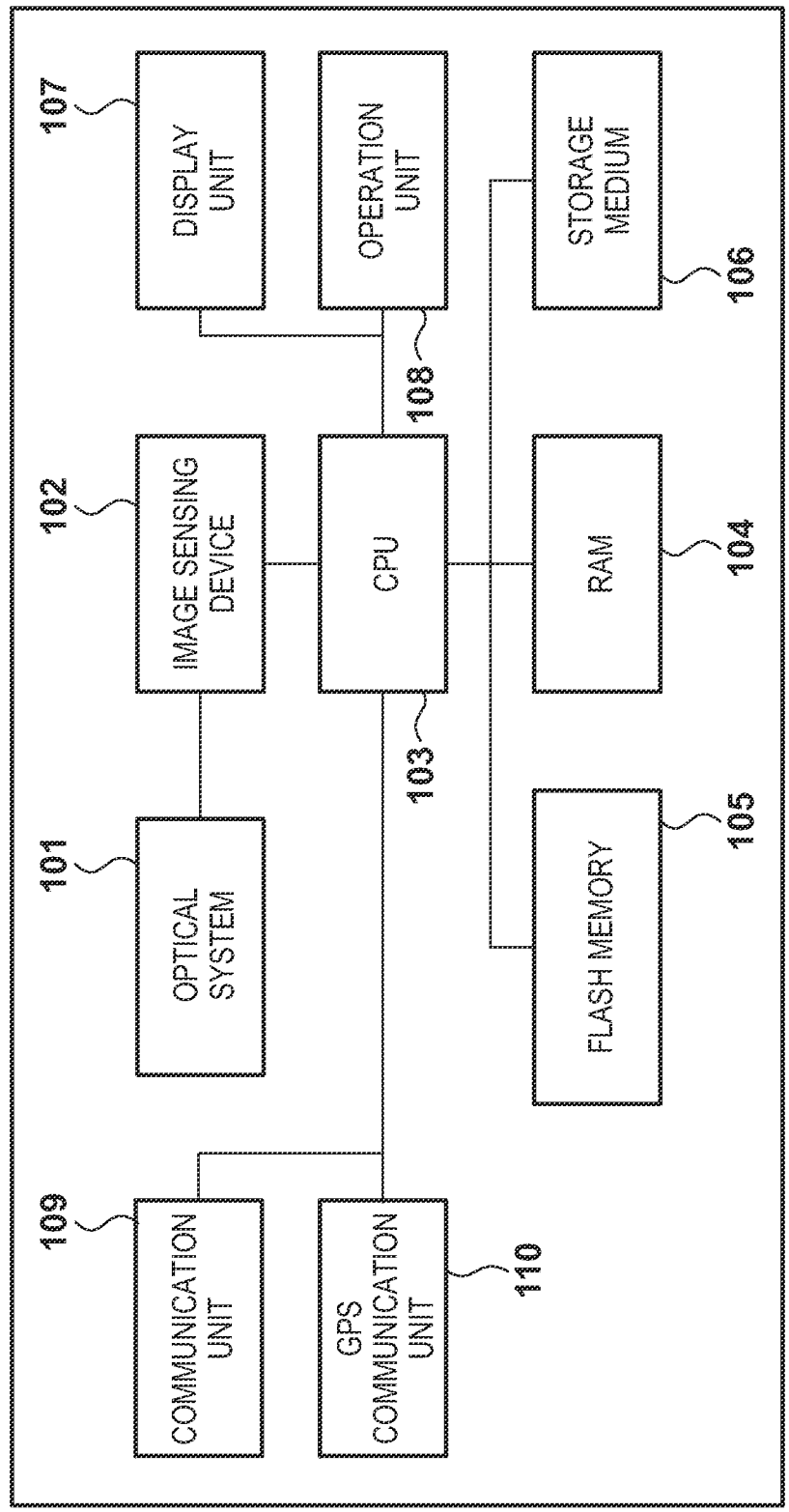
FIG. 1 is a block diagram showing a schematic configuration of a digital camera of an embodiment according to the present invention.

In FIG. 1, the digital camera 100 includes an optical system 101, an image sensing device 102, a CPU 103, a RAM 104, a flash memory 105, a storage medium 106, a display unit 107, an operation unit 108, a communication unit 109, and a GPS communication unit 110.

The optical system 101 is constituted by a lens, a shutter and an aperture, and forms an image of an object on the image sensing device 102 with a suitable light amount and timing. The image sensing device 102 converts the light formed as an image by having passed through the optical system 101 to an electrical signal.

The CPU 103 performs various calculations and controls the components constituting the digital camera 100, according to input signals and programs. Specifically, the CPU 103 performs image sensing control, display control, storage control, communication control, and the like.

The RAM 104 stores temporary data, and is used as a work area for the CPU 103. The flash memory 105 stores a program (firmware) for controlling the digital camera 100 and various setting information.

The storage medium 106 stores shot image data, GPS log files indicating the locations along a path of movement (trajectory) of the digital camera 100, and the like. Note that the storage medium 106 according to this embodiment is a removable memory card, for example, and is inserted into the PC or the like to enable data to be read. Note also that the storage medium 106 may be built into the digital camera 100. That is, the digital camera 100 has at least an accessor for the storage medium 106, and need only perform reading and writing of data from and to the storage medium 106. The display unit 107 performs viewfinder image display at the time of shooting, shot image display, character display for interactive operations, and so on. Note that the digital camera 100 need not include the display unit 107, and need only have the function of controlling display performed by the display unit 107.

The operation unit 108 has the function of receiving user operations, and is applicable as a button, a lever, or a touch panel, for example.

The communication unit 109 is connected so as to communicate with an external apparatus, and transmit and receive control commands and data. As a protocol for establishing connection and conducting data communication, PTP (Picture Transfer Protocol) is used, for example. Note that the communication unit 109 may conduct communication through a wired connection such as a USB (Universal Serial Bus) cable. Further, the communication unit 109 may conduct communication through a wireless connection such as a wireless LAN. Further, the communication unit 109 may be directly connected to an external apparatus or may be connected to an external apparatus via a server or through a network such as the Internet.

The GPS communication unit 110, serving as a position information acquirer, receives GPS signals from GPS satellites to acquire positioning date and time information and information on the current position of the digital camera 100. The CPU 103, serving as a GPS log file generator, successively saves positioning information including the position information and the positioning date and time information acquired by the GPS communication unit 110 to the storage medium 106, and generates a GPS log file. With a GPS log file, as described later with reference to FIG. 4, information on the position of the digital camera 100 logged at a predetermined interval is sequentially described in the same log file, and new log file is generated at a predetermined timing. Note that although the GPS communication unit 110 is used as a position information acquirer in this embodiment, the position of the digital camera 100 may be acquired based on information from a wireless access point or a base station, for example.

The digital camera 100 adds shooting position information of an image file acquired by the GPS communication unit 110 to the image file to generate an image file that includes the shooting position information.

Note that the digital camera 100 may be controlled by a piece of hardware, or plural pieces of hardware may function as units that execute processing in the digital camera 100 while sharing the processing.

Although image files and GPS log files are directly captured from the digital camera 100 into the information processing apparatus in this embodiment, the capturing method is not limited thereto. For example, image files and GPS log files may be captured via a card reader or the like.

Configuration of PC

The configuration of a PC 200 will be described with reference to FIG. 2. In the following, the case where the PC 200 acquires data from the digital camera 100 through wireless communication will be described.

Figure 2:
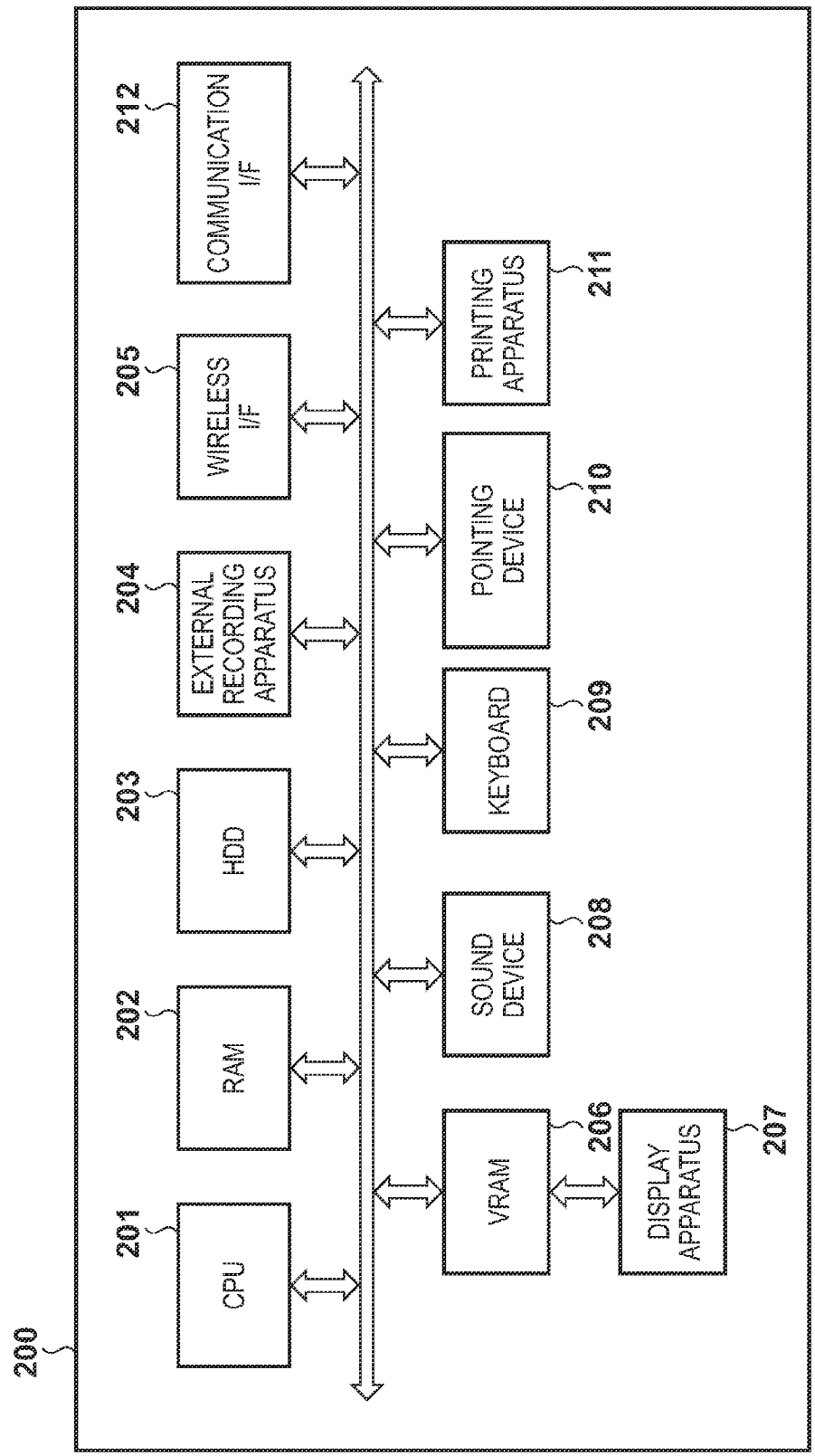
FIG. 2 is a block diagram showing a schematic configuration of a PC of an embodiment according to the present invention.

In FIG. 2, the PC 200 includes a CPU 201, a RAM 202, a HDD 203, an external recording apparatus 204, a wireless interface 205, a VRAM 206, a display apparatus 207, a sound device 208, a keyboard 209, and a pointing device 210. The PC 200 further includes a printing apparatus 211 and a communication interface 212.

The CPU 201 realizes display control, recording control, communication control, and the like of the PC 200 based on input signals and programs.

Programs and image data are expanded in the RAM 202. The programs are composed of program codes for controlling image display and image processing, and are executed by the CPU 201. The RAM 202 is otherwise used as a work area for the CPU 201, an area in which to save data at the time of error processing, and so on. The HDD 203 stores control programs executed by the image display apparatus, content files such as image files and text files, and the like.

The external recording apparatus (removable drive) 204 performs reading from and writing to an external recording medium. Programs and image data, in the case of being recorded in the external recording medium, are loaded into the RAM 202 via the external recording apparatus 204. Examples of the external recording medium include optical disks such as a DVD-RW, a CD-ROM, a CD-R, and a DVD-RAM, magnetic disks such as a flexible disk and a MO, and nonvolatile memories such as a flash memory.

The wireless interface (I/F) 205 is an interface for communicating with an external apparatus. The PC 200 can wirelessly communicate with an external apparatus, via this I/F device. The VRAM 206 outputs video signals such as image data and UIs of executed programs (see FIGS. 5A to 7).

The display apparatus 207 performs display processing of video signals input to the VRAM 206. As the display apparatus 207, a CRT or a LCD can be used, for example. Also, a SED (surface-conduction electron-emitter display) or an EL (electroluminescent) display can be applied.

The sound device 208 processes audio data attached to image data, and transfers the processed data to a speaker or the like, for example. The keyboard 209 is provided with various keys for inputting characters and so on. Examples of the pointing device 210 include a mouse. The pointing device 210 is used to control a mouse pointer displayed on the display screen of the display apparatus 207 and operate program menus and other objects.

The communication interface 212 is a USB-compliant interface, for example, and is used to communicate with the digital camera 100 via the communication unit 109 of the digital camera 100. Although USB is used in this embodiment, other standards, such as LAN, may of course be used. Examples of a protocol for communicating with the digital camera 100 at an upper layer include PTP (Picture Transfer Protocol). The PC 200 can transmit and receive data to and from an external device, using the communication interface 212. In this embodiment, the PC 200 is made to function as a communication apparatus by loading programs and image files recorded in the HDD 203 into the RAM 202 and executing the programs with the CPU 201.

Note that although the wireless interface 205 and the communication interface 212 are described as different devices in this embodiment, the PC 200 may be provided with one chip having the functions of both interfaces.

Connection Configuration of Digital Camera and PC

The configuration of a system in which the digital camera 100 and the PC 200 are connected will now be described with reference to FIG. 3.

Figure 3:
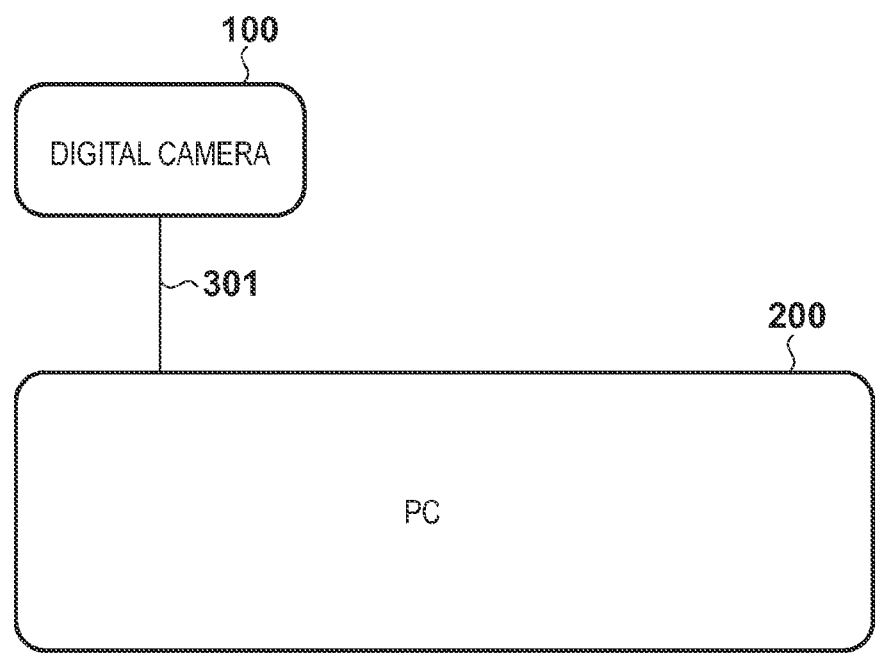
FIG. 3 is a block diagram showing a state in which the digital camera and the PC are connected in the embodiment.

In FIG. 3, the PC 200 and the digital camera 100 are connected via a communication cable 301. Any cable can be used as the communication cable 301 so long as data can be transmitted and received in accordance with PTP. For example, a USB cable can be used. Further, the digital camera 100 and the PC 200 may be connected by a wireless interface conforming to IEEE 802.11x (x being a, b, g, n, etc.), for example, instead of a cable.

Generation of GPS Log File

In this embodiment, the digital camera 100 is provided with three modes, namely a shooting mode, a reproducing mode, and a logging mode, by operation of the operation unit 108 by the user. The GPS logging function of the digital camera 100 operates only in the logging mode, in which positioning date and time information and current position information are acquired as positioning information from a GPS signal received by the GPC communication unit 110, and successively stored in the storage medium 106 as a GPS log file. Having transitioned from the logging mode to the shooting mode or the reproducing mode by a user operation, the GPS logging function is turned off, and the writing of positioning information to the GPS log file saved in the storage medium 106 is stopped. When the logging mode is again restored, the successive writing of positioning information obtained by the GPS communication unit 110 to the GPS log file already saved in the storage medium 106 is resumed. That is, in the logging mode, writing to one file is performed many times.

Further, in the GPS logging function, another GPS log file is newly generated after a predetermined period of time has elapsed, and subsequent positioning information is successively saved to the newly generated GPS log file. In this embodiment, a GPS log file is, in principle, newly generated at the point in time at which one day has elapsed. That is, positioning information acquired by the GPS communication unit 110 in the logging mode is recorded, by writing positioning information successively to a same-day GPS log file saved in the storage medium 106 until one day has elapsed.

Contents of GPS Log File

The recorded contents of a GPS log file generated using the GPS logging function of the digital camera 100 according to this embodiment will be described below with reference to FIG. 4.

In FIG. 4, a manufacturer name 401, a model name 402 and a serial number 403 of the GPS logging apparatus are shown on the 1st line of a GPS log file 400. In this embodiment, since the digital camera has the GPS logging function, the manufacturer name, model name and serial number of the digital camera are shown.

The 2nd and subsequent lines which start with the $ sign are NMEA-0183 format messages that result from signals being received by the GPS logging apparatus and output as log information. NMEA-0183 format is a standard for communication between a GPS receiver and a navigation device via a serial port set by the National Marine Electronics Association.

In this embodiment, two kinds of messages, namely GPGGA and GPRMC, are recorded. Data fields subsequent to each message are marked off with commas. GPGGA refers to global positioning system fix data.

The data fields are, in order: UTC-based positioning time, latitude, north (N) or south (S), longitude, east (E) or west (W), GPS quality, number of receiving satellites, HDOP (horizontal dilution of precision), antenna altitude above mean sea level (m), altitude difference between WGS-84 ellipsoid and mean sea level (m), age of DGPS data (sec.), ID of DGPS reference station, and check sum.

GPRMC refers to recommended minimum specific GNSS data. The data fields are, in order: UTC-based positioning time 404, valid (A) or invalid (V) status, latitude, north (N) or south (S), longitude, east (E) or west (W), ground speed (knots), heading (degrees from due north), UTC-based positioning date 405, geomagnetic declination, mode, and check sum.

Application Screens

In this embodiment, the digital camera 100 and the PC 200 are connected with the communication cable 301, and the CPU 201 of the PC 200 executes the programs stored on the HDD 203 and runs an application.

Through this application, the PC 200 can acquire image files and GPS log files stored in the storage medium 106 of the digital camera 100 via the communication cable 301 and store these files on the HDD 203 of the PC 200. Note that this application is primarily provided with an image file capturing function that can also be used for a digital camera that does not have a GPS communication unit. Further, this application captures GPS log files using a different method from the image file capturing method so long as the connected digital camera supports the GPS logging function and a GPS log file is recorded.

FIGS. 5A to 7 show examples of application screens displayed on the display apparatus 207 by the CPU 201 of the PC 200. With these screens, operations performed by the user using the pointing device 210 or the like are received, and processing corresponding to these operations is performed.

Figure 5A:
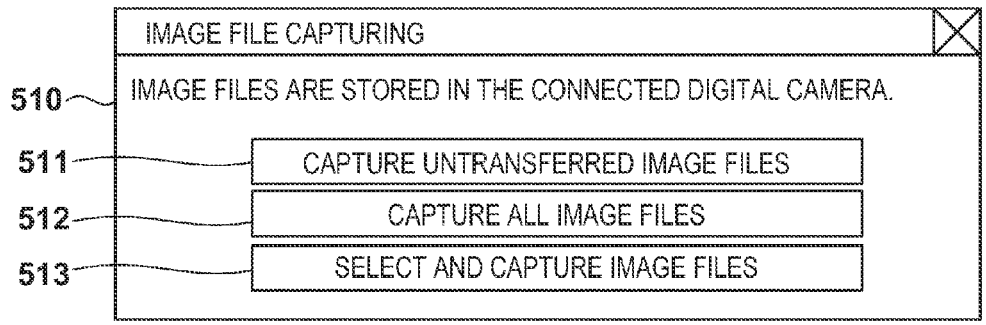
FIG. 5A is a diagram illustrating an image file capturing execution screen displayed by an application according to the embodiment.
Figure 7:
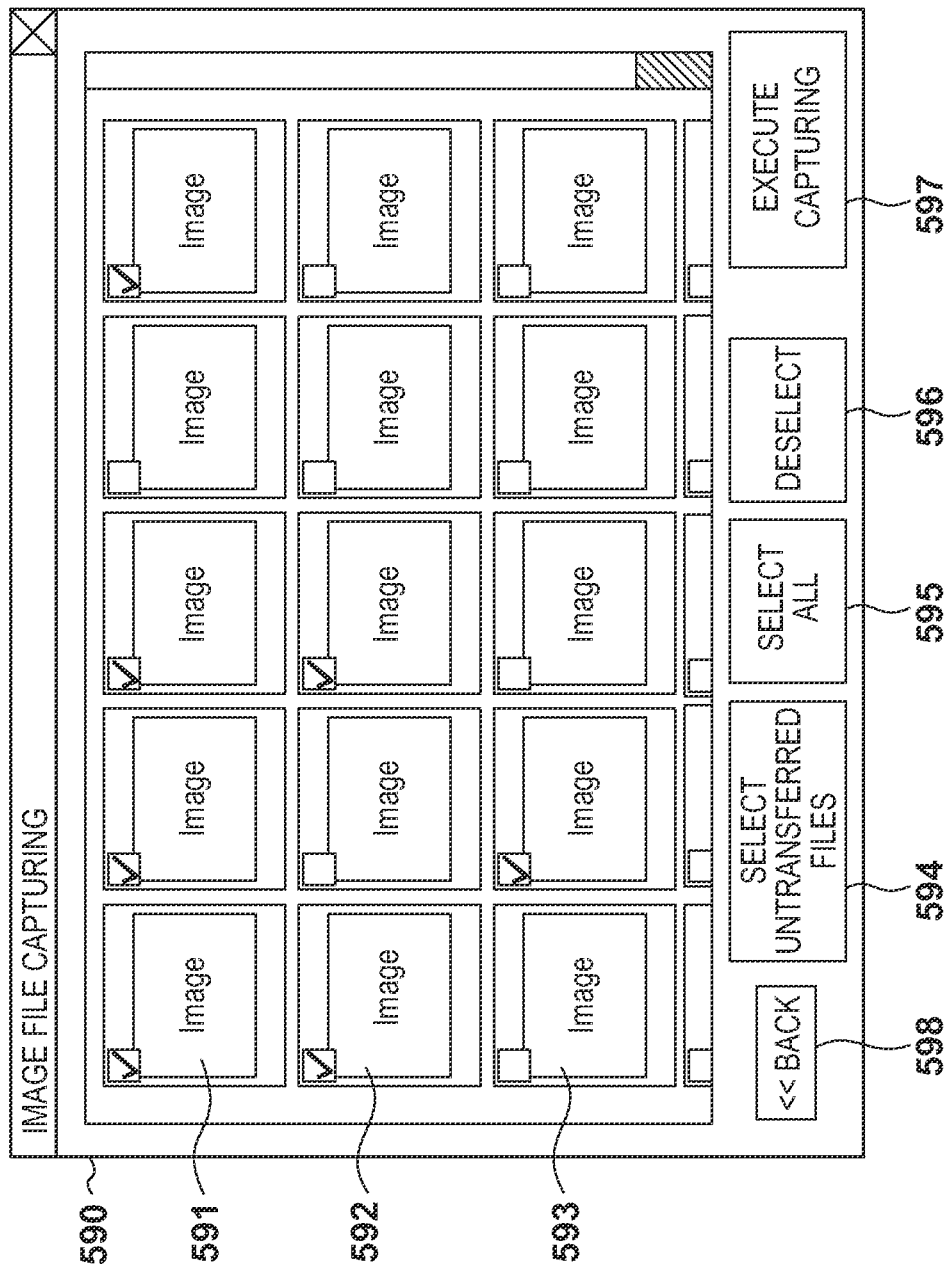
FIG. 7 is a diagram illustrating a screen for selecting and capturing image files displayed by the application according to the embodiment.

FIG. 5A shows an image file capturing execution screen 510 for selecting a method for capturing image files that is displayed after the application is run. A button 511 is an instruction portion for starting the capturing of untransferred image files that have not yet been transferred to the HDD 203 of the PC 200. A button 512 is an instruction portion for starting the capturing of all image files in the digital camera 100. Further, a button 513 is an instruction portion for displaying a list screen of image files saved in the storage medium 106 of the digital camera 100. FIG. 7 shows an example of the list screen. The user can select image files to be captured from the list screen and perform capturing. The screen for selecting image files and executing capturing will be described later. By pressing any one of these buttons, the CPU 201 starts acquisition of image files from the digital camera 100 and displays the screen of FIG. 5B.

Figure 5B:
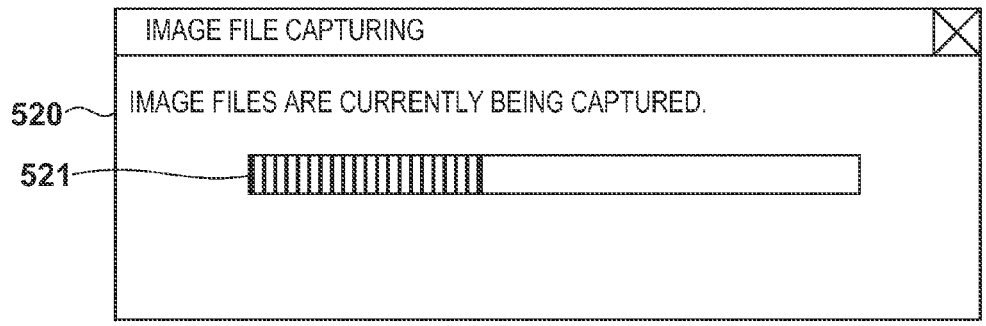
FIG. 5B is a diagram illustrating an image file capturing progress screen displayed by the application according to the embodiment.

FIG. 5B illustrated an image file capturing progress screen 520 displayed when acquisition of image files from the digital camera 100 has been started by the application. The PC 200 performs image file capturing processing by acquiring image files stored in the storage medium 106 of the digital camera 100 and saving acquired image files to the HDD 203. The image file capturing progress screen 520 has a progress bar 521 indicating the progress status of the image file capturing processing. When the capturing processing has finished, FIG. 5C is displayed.

Figure 5C:
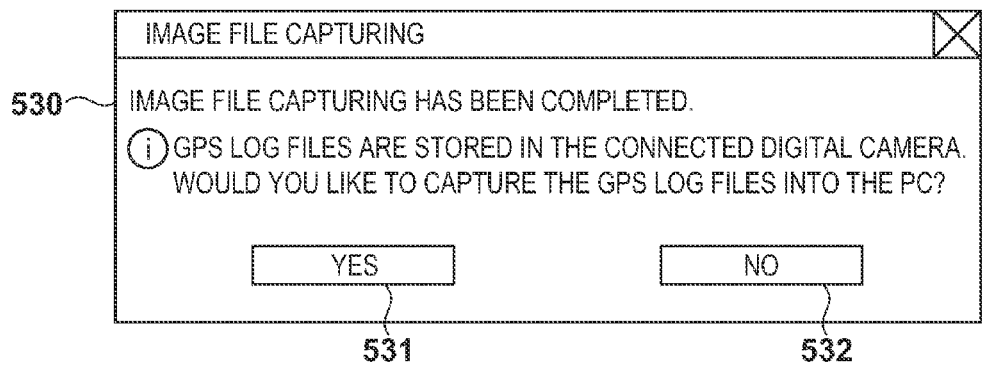
FIG. 5C is a diagram illustrating an image file capturing completion screen displayed by the application according to the embodiment.
Figure 5D:
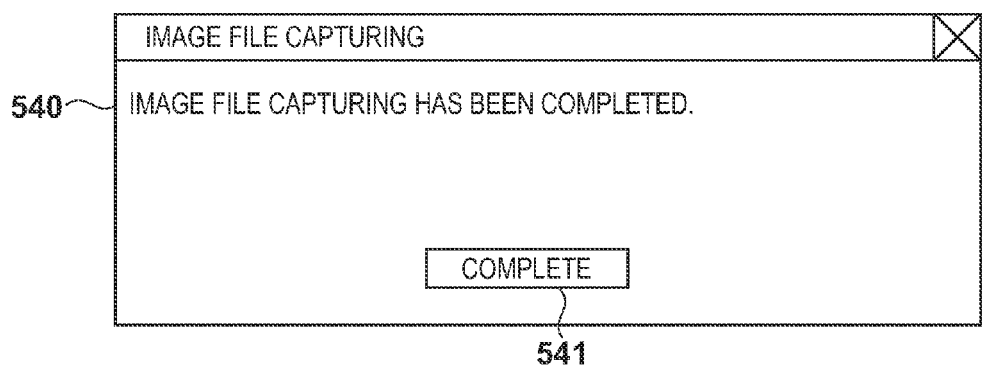
FIG. 5D is a diagram illustrating a GPS log file capturing prompt screen displayed by the application according to the embodiment.
Figure 6A:
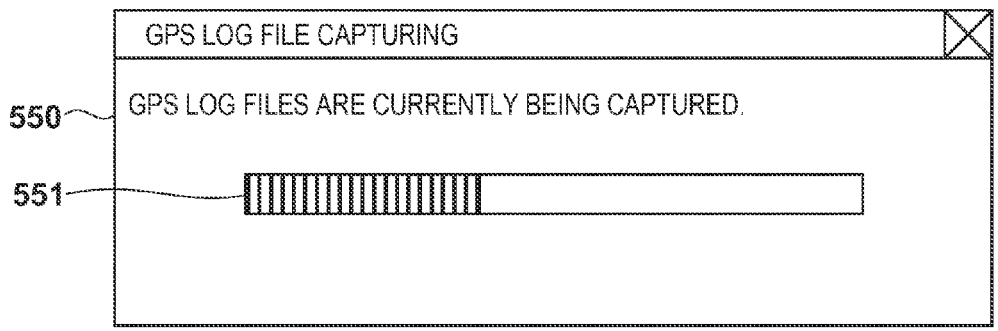
FIGS. 6A and 6B are diagrams illustrating a GPS log file capturing progress screen displayed by the application according to the embodiment.

FIG. 5C is a screen displayed after the application has finished the image file capturing processing. When the digital camera 100 connected to the PC 200 supports the GPS logging function and a GPS log file is stored in the storage medium 106 of the digital camera 100, a GPS log file capturing prompt screen 530 of FIG. 5C is automatically displayed. On the GPS log file capturing prompt screen 530, execution of the GPS log file capturing can be started following the image file capturing. By pressing a button 531, the GPS log file capturing is started, and FIG. 6A is displayed. When a button 532 has been pressed, the sequence of capturing processing ends without performing GPS log file capturing. On the other hand, when the digital camera 100 connected to the PC 200 does not support the GPS logging function, or when the digital camera 100 supports the GPS logging function but a GPS log file is not stored, an image file capturing completion screen 540 of FIG. 5D is displayed. Thereafter, by pressing a button 541 on the image file capturing completion screen 540, the sequence of capturing processing ends.

By operating in this way, the application can, in the case of digital cameras not equipped with a GPS communication unit, be used as an application for merely capturing image files. Further, in the case of digital cameras equipped with a GPS communication unit, image files and GPS log files can be captured together during the sequence of processing.

Figure 6B:
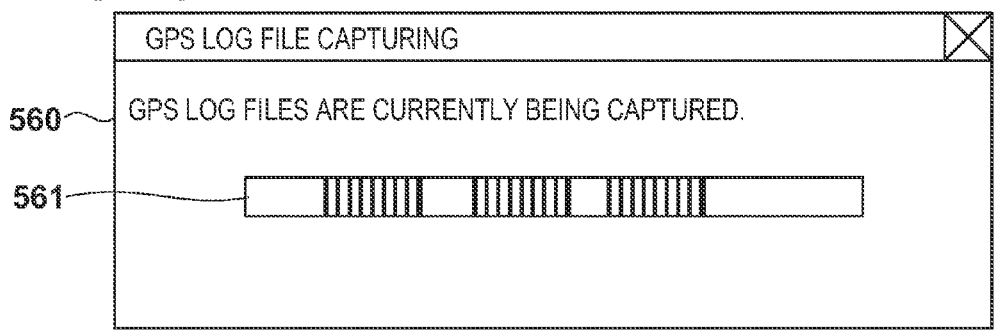

FIGS. 6A and 6B illustrate GPS log file capturing progress screens displayed when the application has started acquisition of GPS log files from the digital camera 100. The PC 200 acquires GPS log files stored in the storage medium 106 of the digital camera 100, and saves the files to a temporary folder of the HDD 203. Then the GPS log files temporarily saved on the HDD 203 are analyzed, and only GPS log files that are determined to have not been transferred from a result of the analysis are copied from the HDD 203 to a dedicated folder. FIG. 6A illustrates a screen 550 displaying the progress of processing for acquiring GPS log files from the digital camera 100 and temporarily saving acquired files to the HDD 203, with a progress bar 551 indicating the progress status of the processing being displayed on the screen. FIG. 6B illustrates a screen 560 displayed during analysis processing of GPS log files temporarily saved to the HDD 203, saving of untransferred GPS log files to the HDD 203, and deletion of the other GPS log files. On the screen 560, a loop animation bar 561 indicating that processing is in progress is displayed.

Figure 6C:
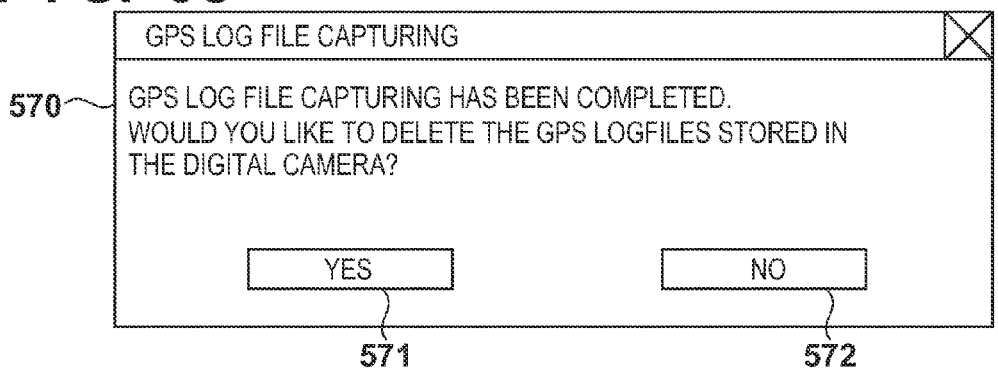
FIG. 6C is a diagram illustrating a GPS log file deletion confirmation screen displayed by the application according to the embodiment.
Figure 6D:
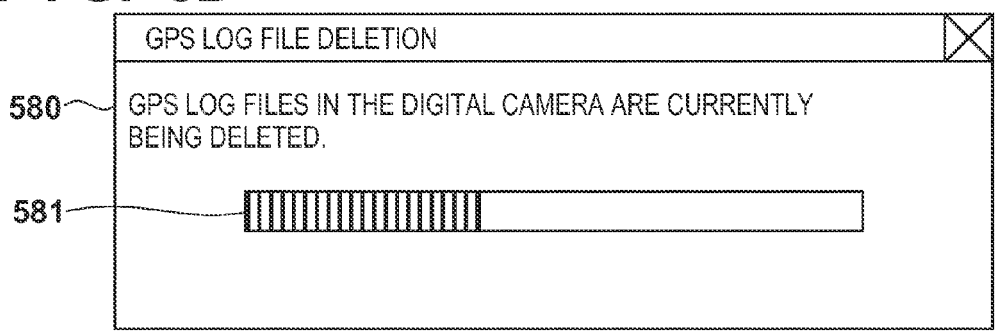
FIG. 6D is a diagram illustrating a GPS log file deletion progress screen displayed by the application according to the embodiment.

FIG. 6C illustrates a GPS log file deletion confirmation screen 570 displayed after the application has finished the processing of capturing GPS log files from the digital camera 100. On the GPS log file deletion confirmation screen 570, the deletion of GPS log files stored in the storage medium 106 of the digital camera 100 can be started following the GPS log file capturing. By pressing a button 571, the GPS log file deletion is started, and the screen of FIG. 6D is displayed. By deleting GPS log files here, captured GPS log files can be deleted without leaving the files unnecessarily in the storage medium 106. On the other hand the sequence of processing ends without performing GPS log file deletion when a button 572 has been pressed. In this case, GPS log files captured into the PC 200 remain in the storage medium 106.

FIG. 6D illustrates a GPS log file deletion progress screen 580 displayed when the deletion of GPS log files stored in the storage medium 106 of the digital camera 100 has been started. The deletion progress screen 580 has a progress bar 581 indicating the progress status of the GPS log file deletion processing. The sequence of processing ends when the deletion processing has finished.

When the sequence of processing has finished, display returns to the image file capturing execution screen 510 of FIG. 5A.

FIG. 7 illustrates a list screen 590 of image files saved in the storage medium 106 of the digital camera 100 that is displayed when the button 513 on the image file capturing execution screen 510 of FIG. 5A has been pressed. On the list screen 590, a list of images 591 stored in the storage medium 106 of the digital camera 100 is displayed. As a result of the user operating the pointing device 210 of the PC 200 and pressing an image selecting portion 592 to select images and then pressing a capturing execution button 597, it is possible to capture only selected image files into the PC 200 (file designating unit). Here, rather than selecting image files one by one, untransferred image files can be selected collectively with a button 594, or all image files can be selected collectively with a button 595. The method of sorting out untransferred image files will be described later. Also, selected image files can be collectively deselected with a button 596. At the time of capturing execution on this screen, image file capturing is started and the image file capturing progress screen 520 and so on are displayed, after which display returns to this screen, so that image selection and capturing can be executed continuously.

Note that in this embodiment the GPS log file capturing prompt screen 530 of FIG. 5C is displayed only once while the application is running. This makes it possible to circumvent both the problem of the capturing prompt screen 530 becoming a distraction when the user performs image file selection and capturing continuously and the problem of the capturing prompt screen 530 becoming a distraction due to the capturing of GPS log files in a digital camera that have already transferred being repeatedly prompted.

Figure 8:
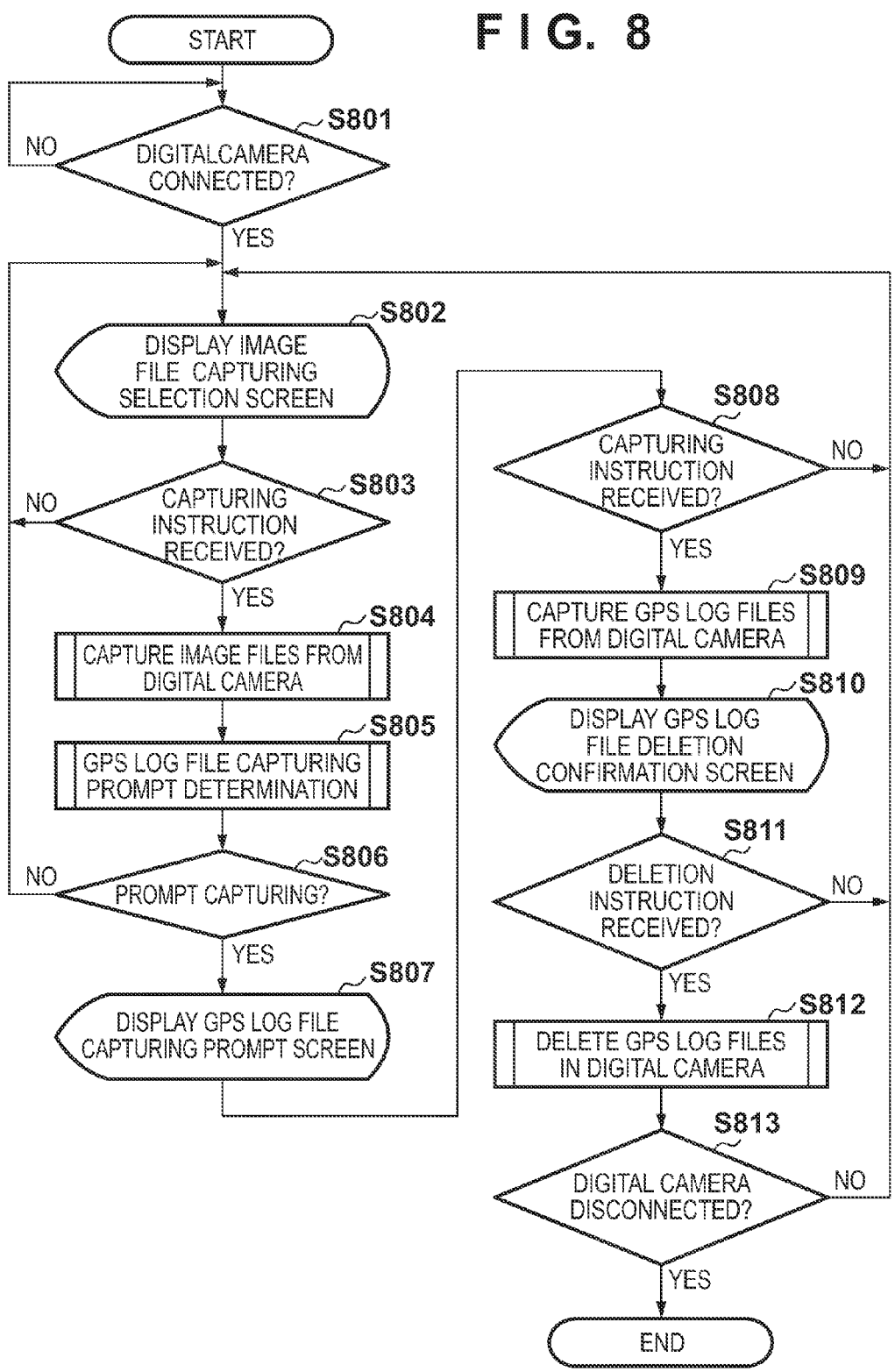
FIG. 8 is a flowchart schematically showing a processing procedure in the PC at the time of capturing image files and GPS log files from the digital camera into the PC in the embodiment.

Processing in PC at Time of Capturing Image Files and GPS Log Files from Digital Camera into PC Processing in the PC 200 at the time of capturing image files and GPS log files from the digital camera 100 into the PC 200 will now be described with reference to FIGS. 8 to 13. FIG. 8 is a flowchart schematically showing a processing procedure in the PC at the time of the capturing image files and GPS log files from the digital camera into the PC.

In FIG. 8, at step S801, the CPU 201 determines whether the digital camera 100 is connected via the wireless interface 205 or the communication interface 212. When the CPU 201 determines at step S801 that the digital camera 100 is connected, the processing shifts to step S802.

At step S802, the CPU 201 causes the display apparatus 207 to display the image file capturing execution screen 510. When the CPU 201 determines at step S803 that the user has instructed capturing, the CPU 201 performs image file capturing processing at step S804, and shifts to step S805. The processing at step S804 will be described later with reference to FIG. 9.

At step S805, the CPU 201 determines whether the conditions for prompting GPS log file capturing are met, and shifts to step S806. Details of this step will be described later with reference to FIG. 10. The processing shifts to step S807 when it is determined at step S805 that the conditions for prompting GPS log file capturing are met. When the conditions for prompting GPS log file capturing are not met, the processing shifts to step S802, and returns to display of the image file capturing execution screen 510.

At step S807, the CPU 201 causes the display apparatus 207 to display the GPS log file capturing prompt screen 530. When the CPU 201 determines at step S808 that the user has instructed GPS log file capturing, the CPU 201 executes GPS log file capturing processing at step S809, and shifts to step S810. The processing at step S809 will be described later with reference to FIG. 12. When the user has instructed not to execute capturing, the processing shifts to step S802, and returns to display of the image file capturing execution screen 510.

At step S810, the CPU 201 causes the display apparatus 207 to display the GPS log file deletion confirmation screen 570. When it is determined at step S811 that the user has instructed GPS log file deletion, the CPU 201 performs deletion processing of GPS log files stored in the storage medium 106 of the digital camera 100 at step S812, and shifts to step S813. The processing at step S812 will be described later with reference to FIG. 13. On the other hand, when the user has instructed not to perform deletion, the processing shifts to step S802, and returns to display of the image file capturing execution screen 510.

At step S813, the CPU 201 determines whether the digital camera 100 has been disconnected, and when the digital camera 100 has not been disconnected, the processing returns to step S802. On the other hand, when the digital camera 100 has been disconnected, processing for capturing image files and GPS log files from the digital camera 100 into the PC 200 is ended.

Processing for Capturing Image Files from Digital Camera (Step S804)

Figure 9:
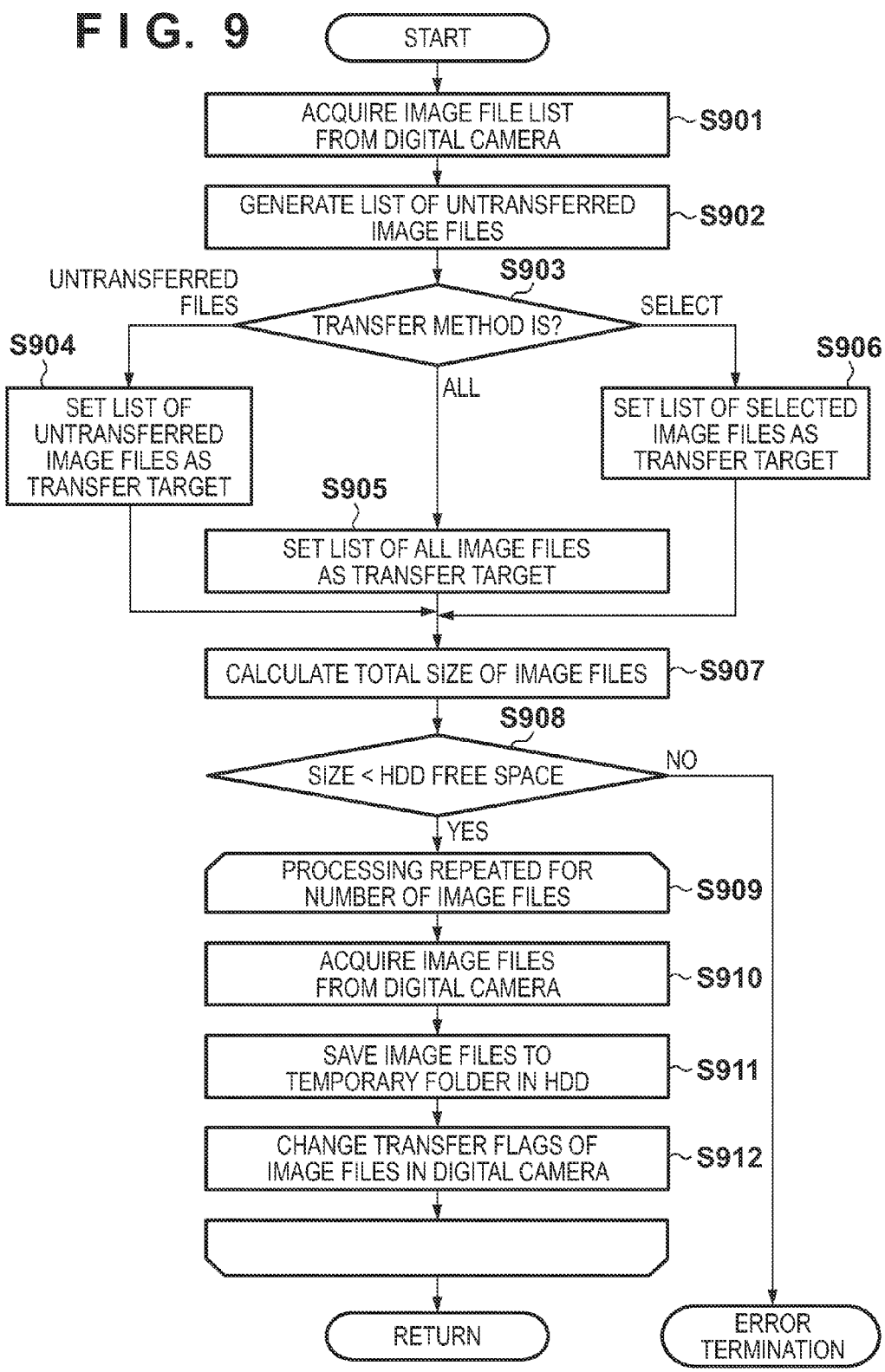
FIG. 9 is a flowchart showing a processing procedure in the PC at the time of capturing image files from the digital camera in the embodiment.

FIG. 9 is a flowchart showing the processing procedure in the PC at the time of capturing image files from the digital camera in step S804 of FIG. 8.

In FIG. 9, at step S901, the CPU 201 acquires a list of image files stored in the storage medium 106 of the digital camera 100, via the communication I/F 212, and shifts to step S902. Here the list of image files includes, all image files stored in the digital camera 100, handle information for accessing each image file, size information on each image file, and transfer flags indicating whether each image file have been transferred.

Note that in this embodiment the transfer flags will be described as flags serving as file attribute information that use archive attributes.

At step S902, a list of untransferred image files possessed by the digital camera 100 is generated from the transfer flags of the image files included in the acquired image file list prior to image file acquisition. The processing then shifts to step S903.

At step S903, the CPU 201 determines the method for capturing image files designated by the user on the image file capturing execution screen 510. In the case of untransferred image files, the list of untransferred image files generated at step S902 is held at step S904 as the transfer target. In the case of all image files, the list of all image files acquired from the digital camera 100 at step S901 is held at step S905 as the transfer target. Further, in the case where the user selects image files to be captured on the image file list screen 590, a list of selected image files is held as the transfer target. After the image file list corresponding to the image file capturing method designated by the user has thus been set as the transfer target, the processing shifts to step S907.

At step S907, the CPU 201 calculates the total size of the image files targeted for transfer based on the image file information list held as the transfer target, and shifts to step S908. At step S908, the CPU 201 compares the total size of the image files targeted for transfer and the free space on the HDD 203. When the total size of the image files is smaller than or equal to the free space on the HDD 203, the processing shifts to step S909, and when the total size of the image files is larger than the free space on the HDD 203, the image file capturing processing is ended.

At step S909, the CPU 201 executes the following processing on all image files targeted for transfer. First, as step S910, the image files are acquired from the digital camera 100 via the communication I/F 212, using the handle information for accessing image files included in the image file information list. Next, as step S911, the acquired image files are saved to the HDD 203. Then, as step S912, a request to change the transfer flags of the image files saved on the HDD 203 is transmitted to the digital camera 100 via the communication I/F 212, and the transfer flags of the image files in the digital camera 100 are changed to indicate transferred.

GPS Log File Capturing Prompt Determination Processing (Step S805)

Figure 10:
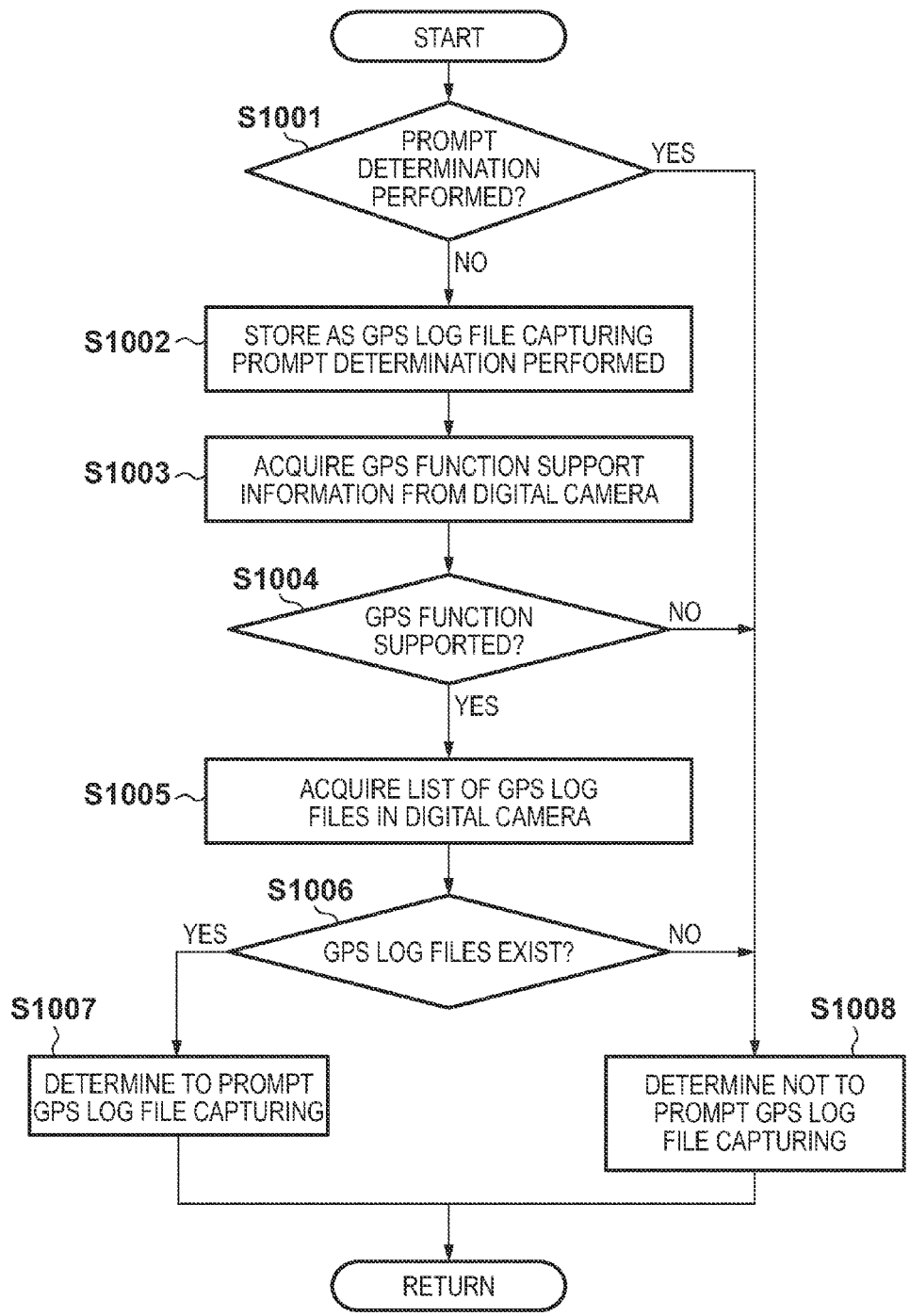
FIG. 10 is a flowchart showing a processing procedure in the PC at the time of determining whether to implement a GPS log file capturing prompt in the embodiment.

FIG. 10 is a flowchart showing the processing procedure in the PC at the time of determining whether to implement the GPS log file capturing prompt in step S805 of FIG. 8.

In FIG. 10, at step S1001, the CPU 201 determines whether to implement the GPS log file capturing prompt, since the GPS log file capturing prompt screen 530 is displayed only once while the application is running. When, at step S1001, the GPS log file capturing prompt determination has not yet been performed, the fact that prompt determined has now been performed is stored at step S1002, following which the processing shifts to step S1003. On the other hand, when the GPS log file capturing prompt determination has already been performed, the processing shifts to step S1008, where it is determined not to prompt GPS log file capturing.

At step S1003, the CPU 201 inquires whether the digital camera 100 supports the GPS logging function, via the communication I/F 212. When, at step S1004, the digital camera 100 supports the GPS logging function, the processing shifts to step S1005. When the digital camera 100 does not support the GPS logging function, the processing shift to step S1008, where it is determined not to prompt GPS log file capturing.

At step S1005, the CPU 201 acquires a list of GPS log files stored in the storage medium 106 of the digital camera 100, via the communication I/F 212, and shifts to step S1006. The GPS log file list includes handle information for accessing each GPS log file and size information on each GPS log file.

When it is determined from the acquired GPS log file list at step S1006 that GPS log files are stored in the storage medium 106 of the digital camera 100, it is determined at step S1007 to prompt GPS log file capturing. On the other hand, when GPS log files are not stored in the storage medium 106 of the digital camera 100, it is determined not to prompt GPS log file capturing.

Note that in this embodiment the GPS log file list acquired at step S1006 does not include information as to whether GPS log files have been transferred, unlike the image file list. In the digital camera 100 according to this embodiment, as described earlier, positioning information is successively written to a same-day GPS log file in the storage medium 106 until one day has elapsed. Even if capturing from the digital camera 100 into the PC 200 has been performed, positioning information will be additionally written if one day has not elapsed in the case where GPS log files stored in the digital camera 100 are left undeleted after capturing. Therefore, a GPS log file to which positioning information has been additionally written after capturing from the digital camera 100 into the PC 200 needs to be re-captured. Further, it is desirable that the GPS log file prior to positioning information being additionally written that has already been transferred into the HDD 203 of the PC 200 be overwritten. The makeup of the data differs from the image files in this respect, and a different determination procedure to the image files is needed to determine whether a GPS log file has been transferred according to the makeup of the GPS log file.

In this embodiment, even if the filename or the like is changed when a GPS log file is saved to the HDD 203 of the PC 200, information recorded in the GPS log file is used in this embodiment to determine whether the GPS log file is untransferred according to the makeup thereof. The attribute information of GPS log files possessed by the digital camera 100 and the attribute information of GPS log files stored in the HDD 203 of the PC 200 are collated, and untransferred GPS log files are specified from the GPS log files possessed by the digital camera 100. A list of transferred GPS log files is generated for use in efficiently executing this processing.

FIG. 11 illustrates the recorded contents of an acquired GPS log file list. The acquired GPS log file list 1100 is a file in which information on GPS log files that have already been saved to the HDD 203 of the PC 200 is recorded, with the information being managed using XML (Extensible Markup Language) in this example.

The file includes the following information as subelements of an information <LogFile> element relating to a GPS log file. A filename <FileName> element 1101 and a save path <Path> element 1102 of a GPS log file that has been captured into the PC 200 and saved to the HDD 203 are recorded. Further, a positioning start date and time <StartTime> element 1103 calculated from the positioning time 404 and the positioning date 405 of the first GPRMC message through analysis of the GPS log file 400 of FIG. 4, and a positioning end date and time <EndTime> element 1104 similarly calculated from the last GPRMC message in the file are recorded. Similarly, the model name 402 and the serial number 403 obtained through analysis of the GPS log file 400 are respectively recorded as a <ModelName> element 1106 and a <SerialNumber> element 1107. A file update date and time <TimeStamp> element 1105 is also recorded.

By using this GPS log file list 1100, processing for opening and analyzing all GPS log files saved to the HDD 203 when collating the attribute information of GPS log files possessed by the digital camera 100 and the attribute information of GPS log files on the HDD 203 can be omitted, and untransferred file determination can be performed efficiently.

Processing for Capturing GPS Log Files from Digital Camera (Step S809)

Figure 12:
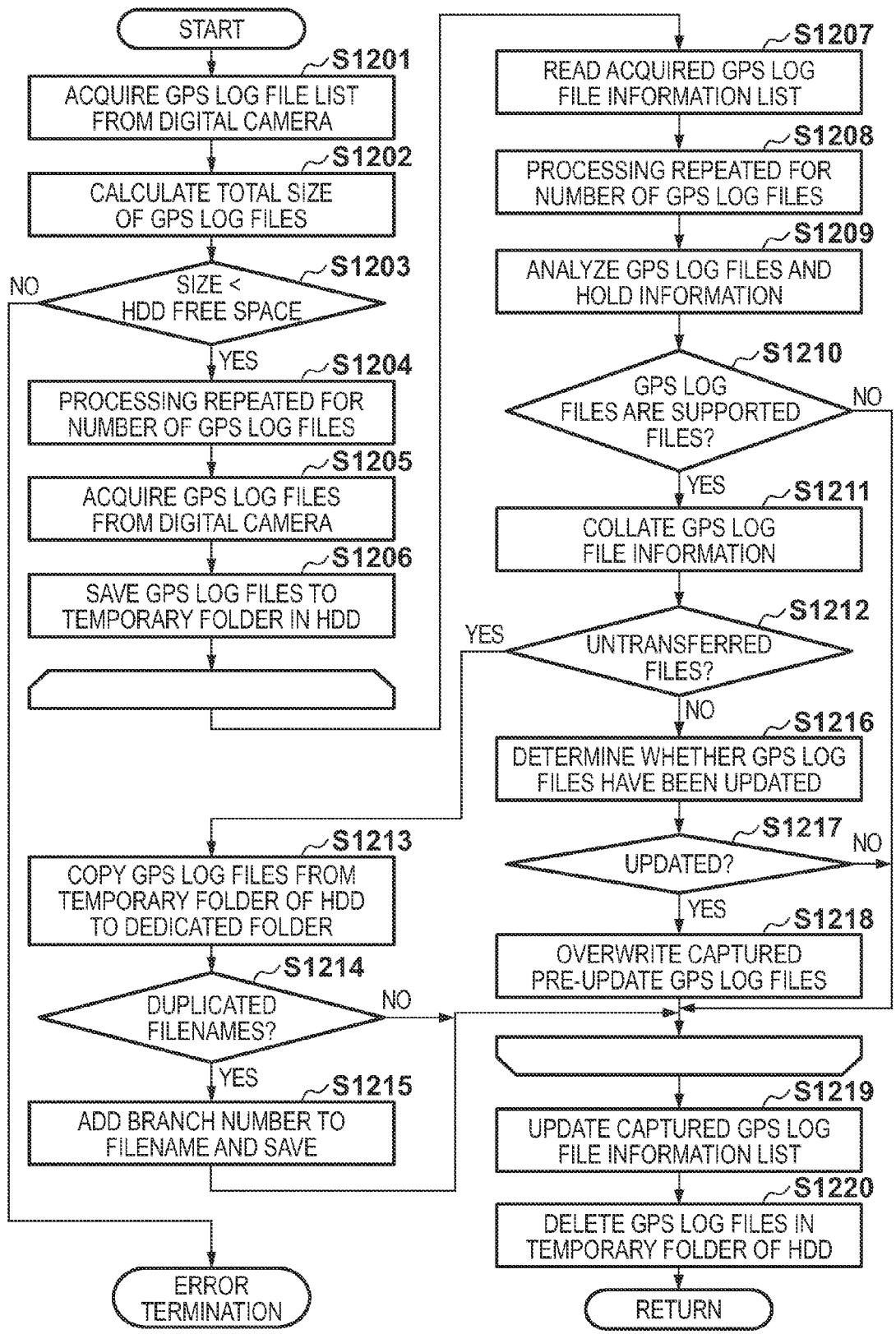
FIG. 12 is a flowchart showing a processing procedure in the PC at the time of capturing GPS log files from the digital camera in the embodiment.

FIG. 12 is a flowchart showing the processing procedure in the PC at the time of capturing GPS log files from the digital camera in step S809 of FIG. 8.

In FIG. 12, at step S1201, the CPU 201 acquires a list of GPS log files stored in the storage medium 106 of the digital camera 100, via the communication I/F 212, and shifts to step S1202. Here, as the GPS log file list, the GPS log file list acquired at step S1005 in the GPS log file capturing prompt determination processing of FIG. 10 may be held for use.

At step S1202, the CPU 201 calculates the total size of GPS log files stored in the storage medium 106 of the digital camera 100 from the GPS log file list acquired at step S1201, and shifts to step S1203. At step S1203, the CPU 201 compares the total size of the GPS log files calculated at step S1202 and the free space on the HDD 203. When, at step S1203, the total size of the GPS log files is smaller than or equal to the free space on the HDD 203, the processing shifts to step S1204, and when the total size of the GPS log files is larger than the free space on the HDD 203, the GPS log file capturing processing is ended.

At step S1204, the CPU 201 performs the following processing on all GPS log files targeted for transfer. That is, as step S1205, a GPS log file is acquired from the digital camera 100 via the communication I/F 212, using handle information for accessing the GPS log file included in the GPS log file information list. Subsequently as step S1206, the acquired GPS log file is save to the temporary folder in the HDD 203. The above processing is repeated for the number of GPS log files, following which the processing shifts to step S1207.

At step S1207, an acquired GPS log file information list is read based on files from the acquired GPS log file information list of FIG. 11, after which the processing shifts to step S1208.

At step S1208, the CPU 201 performs the following processing on all GPS log files targeted for transfer that are saved in the temporary folder of the HDD 203. That is, information obtained by analyzing the GPS log file 400 of FIG. 4 is held as attribute information to be used in the untransferred file determination at step S1209. The GPS log file 400 includes the manufacturer name 401, the model name 402, the serial number 403, a positioning start date and time, and a positioning end date and time. The positioning start date and time are calculated from the positioning time 404 and the positioning date 405 in the first GPRMC message in the file, and the positioning end date and time is similarly calculated from the last GPRMC message in the file.

At step S1210, with the aim of handling only application-supported files, it is a determined whether a GPS log file is a supported file with reference to the manufacturer name 401 acquired from the GPS log file. In this embodiment, a GPS log file is determined to be a supported file only when the manufacturer name 401 is "Ganon", following which the processing shifts to step S1211, and when the manufacturer name 401 is not "Ganon", the processing proceeds to the next GPS log file. At step S1211, to determine whether the GPS log file is an untransferred file, the following collation (not shown) is performed with the information acquired from the GPS log file, as to whether there is a corresponding file in the acquired GPS log file list held at step S1207.

First, the CPU 201 determines whether a <ModelName> element 1106 corresponding to the model name 402 acquired from the GPS log file is included. When there is not a matching model name, the file is determined to have not been transferred, and when there is a matching model name, information is further compared. It is determined whether a <SerialNumber> element 1107 corresponding to the serial number 403 acquired from the GPS log file is included. When there is not a matching serial number, the file is determined to have not been transferred, and when there is a matching serial number, information is further compared. It is determined whether a <StartTime> element 1103 corresponding to the positioning start date and time acquired from the GPS log file is included. When there is not a matching positioning start date and time, the file is determined to have not been transferred, and when there is a matching positioning start date and time, the file is determined to have been transferred.

When the file is determined at step S1212 to have not been transferred as a result of the collation at step S1211, the processing shifts to step S1213, and when the file is determined to have been transferred, the processing shifts to step S1216.

At step S1213, the GPS log file is copied from the temporary folder of the HDD 203 to the dedicated folder, following which the processing shifts to step S1214. At step S1214, it is determined whether any filenames were duplicated at the time of copying, and when there are not any duplicated filenames, the processing proceeds directly to the next GPS log file. When there are duplicated filenames, the respective files are saved after being renamed at step S1215 so as to not overlap, by adding a branch number to the filename "1009040.log" to give "1009040_1.log", for example, following which the processing proceeds to the next GPS log file.

On the other hand, even when a GPS log file is determined at step S1212 to have been transferred, there is a possibility that positioning information has been added to the file as described earlier. That is, even if a GPS log file has been transferred once, there is a possibility that the contents of the file will change due to subsequently being updated. In this case, there is a need to retransfer the updated GPS log file to the PC 200. In view of this, at step S1216, it is determined whether the GPS log file has been updated. At step S1216, the positioning end date and time acquired from the GPS log file saved in the temporary folder of the HDD 203 and the <EndTime> element 1103 in the acquired GPS log file list are compared, following the processing at step S1212.

When the CPU 201 determines at step S1217 that the positioning end date and time acquired from the GPS log file stored in the temporary folder of the HDD 203 is newer, the processing shifts to step S1218, and when this is not the case, the processing proceeds to the next GPS log file. At step S1218, the transferred GPS log file is overwritten with the GPS log file saved in the temporary folder of the HDD 203, based on the <Path> element 1102 in the acquired GPS log file list.

By executing the above processing on all the GPS log files, untransferred GPS log files are saved to the HDD 203. Further, GPS log files that have already been transferred to the HDD 203 are overwritten with GPS log files to which information has been added with the GPS logging function of the digital camera 100 after capturing.

Subsequently at step S1219, after processing has been performed on all the GPS log files at step S1218, the GPS log file list acquired at step S1207 is updated to reflect the contents of this processing. As a result, the list can be used in an updated state at the time of the next GPS log file capturing.

Finally, at step S1220, the CPU 201 deletes the GPS log files saved in the temporary folder of the HDD 203.

Note that although it is determined at step S1217 that the GPS log file has been updated when the positioning end date and time of the GPS log file saved in the temporary folder of the HDD 203 is newer, the size of the GPS log file or the update date and time of attribute information may be used. In the case where the size of the GPS log file is used, it can be determined that the file has been updated when the size is larger than that of the GPS log file that has already been transferred. In the case where the update date and time of the attribute information of the GPS log file is used, it can be determined that the file has been updated when the date and time is newer than that of the GPS log file that has already been transferred.

Deletion Processing of GPS Log Files Possessed by Digital Camera (Step S812)

FIG. 13 is a flowchart showing the processing procedure in the PC at the time of deleting GPS log files possessed by the digital camera in step S812 of FIG. 8.

In FIG. 13, at step S1301, the CPU 201 acquires a list of GPS log files stored in the storage medium 106 of the digital camera 100, via the communication I/F 212, and shifts to step S1302. Here, as the above GPS log file list, the GPS log file list acquired at step S805 in the GPS log file capturing prompt determination processing of FIG. 10 may be held for use.

At step S1302, the CPU 201 performs the following processing on all GPS log files targeted for transfer. That is, at step S1303, the CPU 201 designates GPS log files to be deleted, from the GPS log files included in the GPS log file list, via the communication I/F 212 (deletion file designation processing).

At step S1304, the CPU 201 transmits a request to delete the designated GPS log files to the digital camera 100, using handle information for accessing the GPS log files to be deleted (deletion request transmission processing).

File Transfer Processing in Digital Camera

Figure 14B:
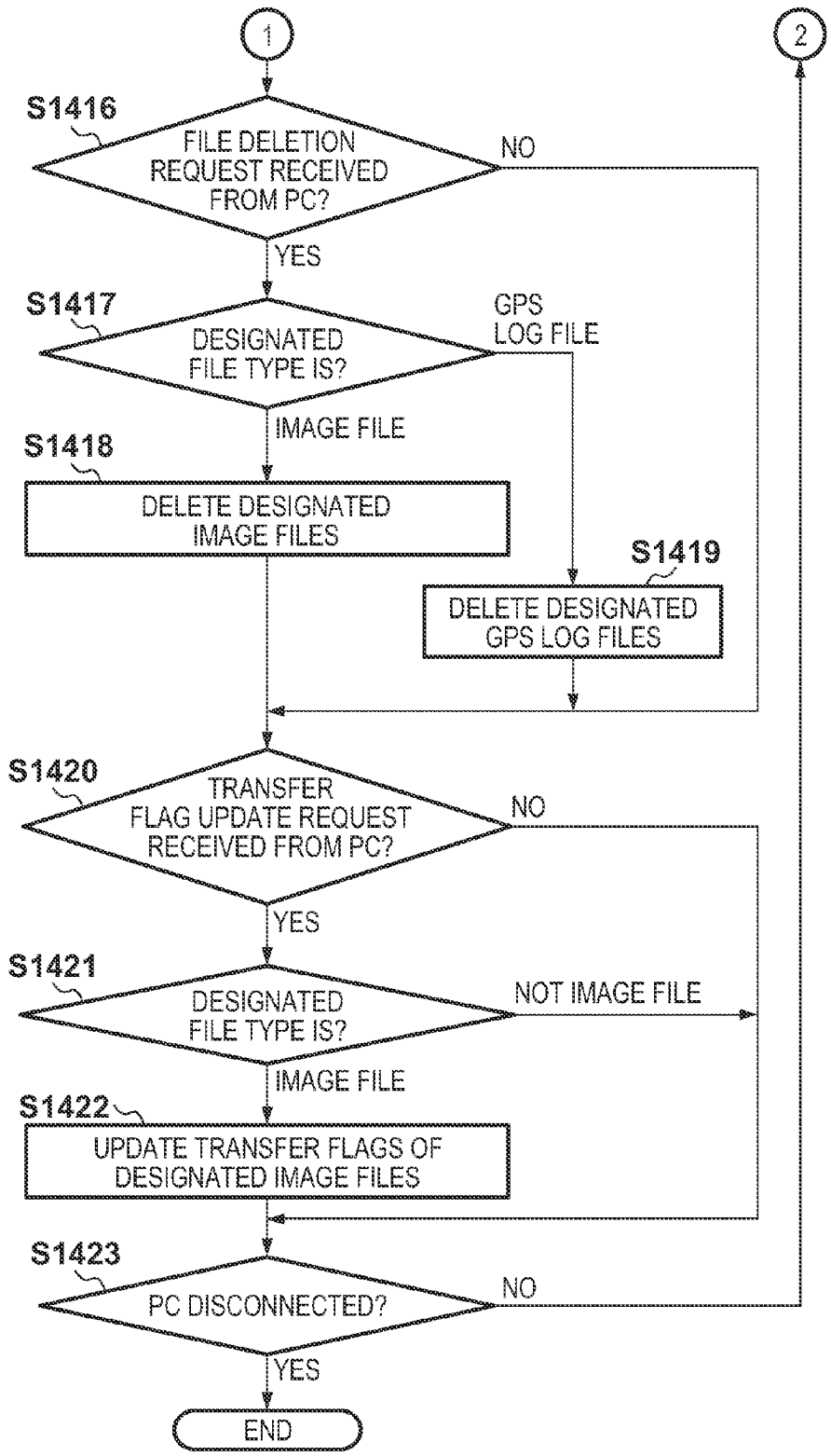

Processing in the digital camera at the time of capturing image files and GPS log files from the digital camera 100 into the PC 200 will now be described with reference to FIGS. 14A and 14B. FIGS. 14A and 14B are flowcharts showing the processing procedure in the digital camera 100 at the time of capturing image files and GPS log files from the digital camera into the PC.

In FIG. 14A, at step S1401, the CPU 103 determines whether the PC 200 is connected via the communication unit 109, and when connected, the processing shifts to step S1402. At step S1402, the CPU 103 determines whether a GPS function support information acquisition request has been acquired from the PC 200. When acquired, the processing shifts to step S1403, and when not acquired, the processing shifts to step S1404. At step S1403, the CPU 103 notifies GPS function support information to the PC 200 via the communication unit 109, and shifts to step S1404. Here the GPS function support information includes information as to whether the digital camera 100 is compatible with the GPS logging function.

When the CPU 103 has acquired a list acquisition request from the PC 200 at step S1404, the processing shifts to step S1405, and when this is not the case, the processing shifts to step S1412. At step S1405, the CPU 103 determines a designated file type of the list acquisition request. In the case of an image file list acquisition request, the processing shifts to step S1406, and in the case of a GPS log file list acquisition request, the processing shifts to step S1409.

At step S1406, the CPU 103 acquires the handles of all image files stored in the storage medium 106 of the digital camera 100, and, at step S1407, acquires information on all the image files and generates a list. At step S1408, the CPU 103 transmits the generated image file list to the PC 200 via the communication unit 109, and shifts to step S1412.

On the other hand, at step S1409, the CPU 103 acquires the handles of all GPS log files stored in the storage medium 106 of the digital camera 100, and, at step S1410, acquires information on all the GPS log files and generates a list. At step S1411, the CPU 103 transmits the generated GPS log file list to the PC 200 via the communication unit 109, and shifts to step S1412.

When the CPU 103 has received a file acquisition request from the PC 200 at step S1412, the processing shifts to step S1413, and when this is not the case, the processing shifts to step S1416. At step S1413, the CPU 103 determines a designated file type of the file acquisition request. In the case of an image file acquisition request, the processing shifts to step S1414, and in the case of a GPS log file acquisition request, the processing shifts to step S1415. At step S1414, the CPU 103 transfers image files to the PC 200 via the communication unit 109, and shifts to step S1416. On the other hand, at step S1415, the CPU 103 transfers GPS log files to the PC 200 via the communication unit 109, and shifts to step S1416.

When the CPU 103 has received a file deletion request from the PC 200 at step S1416, the processing shifts to step S1417, and when this is not the case, the processing shifts to step S1420. At step S1417, the CPU 103 determines a designated file type of the file deletion request. In the case of an image file deletion request, the processing shifts to step S1418, and in the case of a GPS log file deletion request, the processing shifts to step S1419. At step S1418, the CPU 103 deletes image files designated to be deleted from the storage medium 106, and shifts to step S1420. On the other hand, at step S1419, the CPU 103 deletes GPS log files designated to be deleted from the storage medium 106, and shifts to step S1420.

When the CPU 103 has received a transfer flag update request from the PC 200 at step S1420, the processing shifts to step S1421, and when this is not the case, the processing shifts to step S1423. At step S1421, the CPU 103 determines a designated file type of the transfer flag update request. Note that the digital camera 100 of this embodiment supports only image file transfer flag updates. Therefore, when a transfer flag update request for image files is received, the processing shifts to step S1422, and when a transfer flag update request for files other than image files is received, the processing shifts to step S1423. At step S1422, the CPU 103 updates the transfer flags of image files stored in the storage medium 106, and shifts to step S1423.

At step S1423, the CPU 103 determines whether the PC 200 has been disconnected. When the PC 200 has not been disconnected, the processing returns to step S1402, and when the PC 200 has been disconnected, the processing ends.

Other Embodiments

Note that although image file capturing and GPS log file capturing are realized by the function of the same application in the above embodiment, the present invention is not necessarily limited to this configuration. For example, the respective capturing processing may be implemented with separate applications, or the file capturing processing and the image file transfer determination processing may be performed with a specific application, and the GPS log file transfer determination processing may be executed with another application. By adopting such a configuration, a particular application need only be run when capturing GPS log files, thus eliminating the need to run a sophisticated application when only performing capturing of image files.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-023244, filed Feb. 4, 2011, which is hereby incorporated by reference herein in its entirety.

What is claimed is:

1. An information processing apparatus which is connectable with an image supplying apparatus having a unit configured to acquire position information, comprising:
   a file receiving unit configured to receive, from the image supply apparatus, an image file having shooting position information attached and a log file indicating locations along a path of movement of the image supplying apparatus; and
   a determining unit configured to determine whether a file stored in the image supply apparatus has already been transferred,
   wherein the determining unit determines whether the file has already been transferred, in accordance with a determination procedure that differs between a case where the file is an image file and a case where the file is a log file.

2. The apparatus according to claim 1, wherein
   position information of the image supplying apparatus logged at a predetermined interval is sequentially described in the log file, and a new log file is generated at a predetermined timing,
   the apparatus further comprising a list acquiring unit configured to acquire a list of image files and a list of log files possessed by the image supplying apparatus prior to acquisition of the image file and the log file.

3. The apparatus according to claim 2, wherein
   the determining unit determines, based on attribute information of an image file contained in the list, whether the image file has already been transferred, and
   the determining unit determines, based on attribute information of a log file contained in the list, whether the log file is a newly generated log file and whether the log file is an updated log file.

4. The apparatus according to claim 3, wherein the determining unit determines whether the log file is a newly generated log file based on at least one of a positioning start date and time and a filename that are described in the log file as attribute information of the log file.

5. The apparatus according to claim 3, wherein the determining unit determines the log file to be an updated log file, in a case that at least one of a positioning start date and time and a filename that are described in the log file as attribute information of the log file is matched, and in a case that at least one of a case where a positioning end date and time described in the log file is newer, a case where a size of the log file is larger, and a case where an update date and time of the log file is newer is satisfied.

6. The apparatus according to claim 1, further comprising:
a deletion file designating unit configured to designate and delete a transferred file from among image files and log files possessed by the image supplying apparatus; and
a deletion request transmitting unit configured to transmit a request to delete a file designated by the deletion file designating unit.

7. The apparatus according to claim 1, further comprising:
a file designating unit configured to designate an image file and a log file to be transferred from the image supplying apparatus; and
wherein the determining unit determines, in a case that a file to be transferred is designated by the file designating unit, whether the designated file has already been transferred.

8. The apparatus according to claim 1, wherein the file receiving unit does not receive the file determined as a file which has already been transferred.

9. A control method of an information processing apparatus which is connected so as to communicates with an image supplying apparatus having a unit configured to acquire position information, the method comprising the steps of:
receiving, from the image supplying apparatus, an image file having shooting position information attached and a log file indicating locations along a path of movement of the image supplying apparatus; and
determining whether a file stored in the image supply apparatus has already been transferred,
wherein the determining step comprises determining whether the file has already been transferred, in accordance with a determination procedure that differs between a case where the file is an image file and a case where the file is a log file.

10. A computer-readable storage medium storing a program for causing a computer to execute the control method of the information processing apparatus according to claim 9.

11. The method according to claim 9, wherein
position information of the image supplying apparatus logged at a predetermined interval is sequentially described in the log file, and a new log file is generated at a predetermined timing,
the method further comprising acquiring a list of image files and a list of log files possessed by the image supplying apparatus prior to acquisition of the image file and the log file.

12. The method according to claim 11, wherein
in the determining step, it is determined, based on attribute information of an image file contained in the list, whether the image file has already been transferred, and
in the determining step, it is determined, based on attribute information of a log file contained in the list, whether the log file is a newly generated log file and whether the log file is an updated log file.

13. The method according to claim 12, wherein in the determining step, it is determined whether the log file is a newly generated log file based on at least one of a positioning start date and time and a filename that are described in the log file as attribute information of the log file.

14. The method according to claim 12, wherein in the determining step, determining the log file to be an updated log file, in a case that at least one of a positioning start date and time and a filename that are described in the log file as attribute information of the log file is matched, and in a case that at least one of a case where a positioning end date and time described in the log file is newer, a case where a size of the log file is larger, and a case where an update date and time of the log file is newer is satisfied.

15. The method according to claim 9, further comprising:
designating and deleting a transferred file from among image files and log files possessed by the image supplying apparatus; and
transmitting a request to delete a file designated by the deletion file designating unit.

16. The method according to claim 9, further comprising:
designating an image file and a log file to be transferred from the image supplying apparatus,
wherein in the determining step, it is determined, in a case that a file to be transferred is designated by the file designating unit, whether the designated file has already been transferred.

17. The method according to claim 9, wherein in the file receiving step, the file determined as a file which has already been transferred, is not received.

18. A control method of an information processing apparatus which is connected so as to communicate with an image supplying apparatus having a unit configured to acquire position information, the method comprising the steps of:
receiving, from the image supplying apparatus, an image file having shooting position information attached and a log file indicating locations along a path of movement of the image supplying apparatus;
recording the received file in a recording medium; and
determining whether a file stored in the image supply apparatus has already been recorded,
wherein the determining step comprises determining whether the file has already been recorded, in accordance with a determination procedure that differs between a case where the file is an image file and a case where the file is a log file.

19. A computer-readable storage medium storing a program for causing a computer to execute the control method of the information processing apparatus according to claim 11.

20. A computer-readable storage medium storing a program for causing a computer to execute the control method of the information processing apparatus according to claim 12.

21. A computer-readable storage medium storing a program for causing a computer to execute the control method of the information processing apparatus according to claim 15.

22. A computer-readable storage medium storing a program for causing a computer to execute the control method of the information processing apparatus according to claim 13.

23. A computer-readable storage medium storing a program for causing a computer to execute the control method of the information processing apparatus according to claim 14.

24. A computer-readable storage medium storing a program for causing a computer to execute the control method of the information processing apparatus according to claim 16.

25. A computer-readable storage medium storing a program for causing a computer to execute the control method of the information processing apparatus according to claim 17.

26. A computer-readable storage medium storing a program for causing a computer to execute the control method of the information processing apparatus according to claim 18.

* * * * *